United States Patent [19]

Akiyama

[11] Patent Number: 4,720,848

[45] Date of Patent: Jan. 19, 1988

[54] COMMUNICATION SYSTEM WITH VOICE ANNOUNCEMENT MEANS

[75] Inventor: Tadahiko Akiyama, Koriyama, Japan

[73] Assignee: Nippo Communication Industrial Co., Japan

[21] Appl. No.: 676,862

[22] Filed: Nov. 30, 1984

[30] Foreign Application Priority Data

Dec. 5, 1983 [JP] Japan .................. 58-228429

[51] Int. Cl.$^4$ .................. H04M 1/57; H04M 3/42
[52] U.S. Cl. .................. 379/88; 379/217; 379/374
[58] Field of Search ............ 179/18 BF, 18 BE, 18 B, 179/27 FH, 5.5, 5 P, 89, 81 B, 84 C, 84 B, 18 BG, 18 BH; 379/57, 157, 217, 211, 215, 374, 142, 48, 41, 88, 89

[56] References Cited

U.S. PATENT DOCUMENTS

| | | | |
|---|---|---|---|
| 3,898,396 | 8/1975 | Gushue et al. .................. | 379/25 |
| 4,096,358 | 6/1978 | Bidlack et al. .................. | 379/159 |
| 4,266,102 | 5/1981 | Stanley et al. .................. | 379/157 |
| 4,313,035 | 1/1982 | Jordan et al. .................. | 379/207 |
| 4,355,207 | 10/1982 | Curtin .................. | 379/67 |
| 4,376,875 | 3/1983 | Beirne .................. | 379/88 |
| 4,424,514 | 1/1984 | Fennell et al. .................. | 340/825.52 |
| 4,440,989 | 4/1984 | Gibb .................. | 379/157 |
| 4,453,041 | 6/1984 | Castro et al. .................. | 379/373 |
| 4,580,012 | 4/1986 | Matthews et al. .................. | 379/245 |
| 4,582,956 | 4/1986 | Doughty .................. | 379/94 |

FOREIGN PATENT DOCUMENTS

| | | | |
|---|---|---|---|
| 2749803 | 5/1979 | Fed. Rep. of Germany ...... | 379/142 |
| 2844559 | 4/1980 | Fed. Rep. of Germany ...... | 379/355 |
| 0020367 | 2/1981 | Japan .................. | 379/142 |
| 0164658 | 12/1981 | Japan .................. | 379/142 |
| 0004640 | 1/1982 | Japan .................. | 379/88 |
| 0068961 | 4/1982 | Japan .................. | 379/88 |

OTHER PUBLICATIONS

"User Interface for Audio Communication System", S. J. Boies et al., IBM Tech. Discl. Bulletin, vol. 25, No. 7A, Dec. 1982, pp. 3371-3377.

Primary Examiner—Thomas W. Brown
Attorney, Agent, or Firm—Antonelli, Terry & Wands

[57] ABSTRACT

A communication system renders improved service for users by announcing in a vocal message information about the call such as the called person's name, calling person's name and class of urgency of the call during the phase or ring. For paging the called person's name, a directory number assigned to each of telephone users is dialled, or for notifying the calling person's name, a memory card such as a magnetic card memorizing the identification code of a calling person is set on a calling terminal device, so that necessary information is transferred to the switching system. The information is edited and synthesized into a vocal message in the switching system or in each terminal device using the speech synthesizing technique, and it is announced on the called terminal device during the silent time of the phase of ring.

9 Claims, 8 Drawing Figures

COMMUNICATION SYSTEM WITH VOICE ANNOUNCEMENT MEANS

The present invention relates to a communication system and, particularly, more to a communication system, such as a telephone system, which, when a call is made to a specific person, is capable of providing a service to the users of the system in providing a vocal message having information about a call, such as the called person's name.

In the conventional telephone system, each telephone instrument is given a specific directory number (code), and a calling person dials the number of a desired telephone instrument. However, it is rather a rare case that each person has his or her own telephone instrument, and in general a person near the called telephone instrument responds to the call and asks the calling person whom he or she wants to talk with and then passes the call to the actual called person. Namely, it takes two steps of procedure for the calling person to call a specific person, i.e., first calling a telphone instrument to tell an arbitrary responding person of the called person's name, and then communication is established with the called person.

It is convenient for the called person to know before taking a call who makes the call or whether it is an urgent call or not. However, the conventional telephone system provides no such information for the called person.

A prime object of the present invention is to provide a comunication system having improved service to the called party through provision of a vocal announcement of the called person's name, the calling person's name and/or the urgency of the call during the ringing phase of operation.

Another object of the invention is to provide a communication system with improved service to the calling party through vocal announcement or situations including "called station busy", "trunk busy", "called person absent" and "do not disturb".

Still another object of the invention is to provide a communication system capable of providing a talking party with a vocal message concerning urgent information or another incoming call, such as a call which is waiting.

In order to achieve the foregoing objectives, the inventive communication system is arranged such that the switching equipment receives from the calling party information including a directory number assigned to each person for paging the called person's name, an identification number of a calling person recorded on a memory card which is read through a calling terminal device (e.g. telephone instrument) for announcing the calling person's name, and/or a class or degree of urgency which is entered through a key on the calling terminal device for indicating the urgency of the call, and after the information has been edited and converted to a vocal message by the speech coding synthesizing technique, such as provided by a waveform coder/synthesizer, source coder/synthesizer and vocal-tract synthesizer inside the switching equipment or terminal device, the vocal message is sent to the calling or called terminal device during a silent time of the ring signal, for example.

Preferred embodiments of the present invention will now be described in conjunction with the accompanying drawings, in which.

The first embodiment of the invention, for announcing the called person's name, will be explained. In the telephone switching system shown in FIG. 1, telephone instruments 100 as terminal devices are given terminal directory numbers "$T_1$" through "$T_n$". Individual persons who use the telephone instruments 100 are given person directory numbers "$P_1$" through "$P_m$". However, this does not mean that all of the telephone instruments and all of the persons need to be numbered, but the assignment of numbers may be determined depending on the operational environment of the system. Accordingly, a calling person can dial a P-series number for making a call to an individual by name, or a T-series number for making a call solely to a station.

Figure 1:
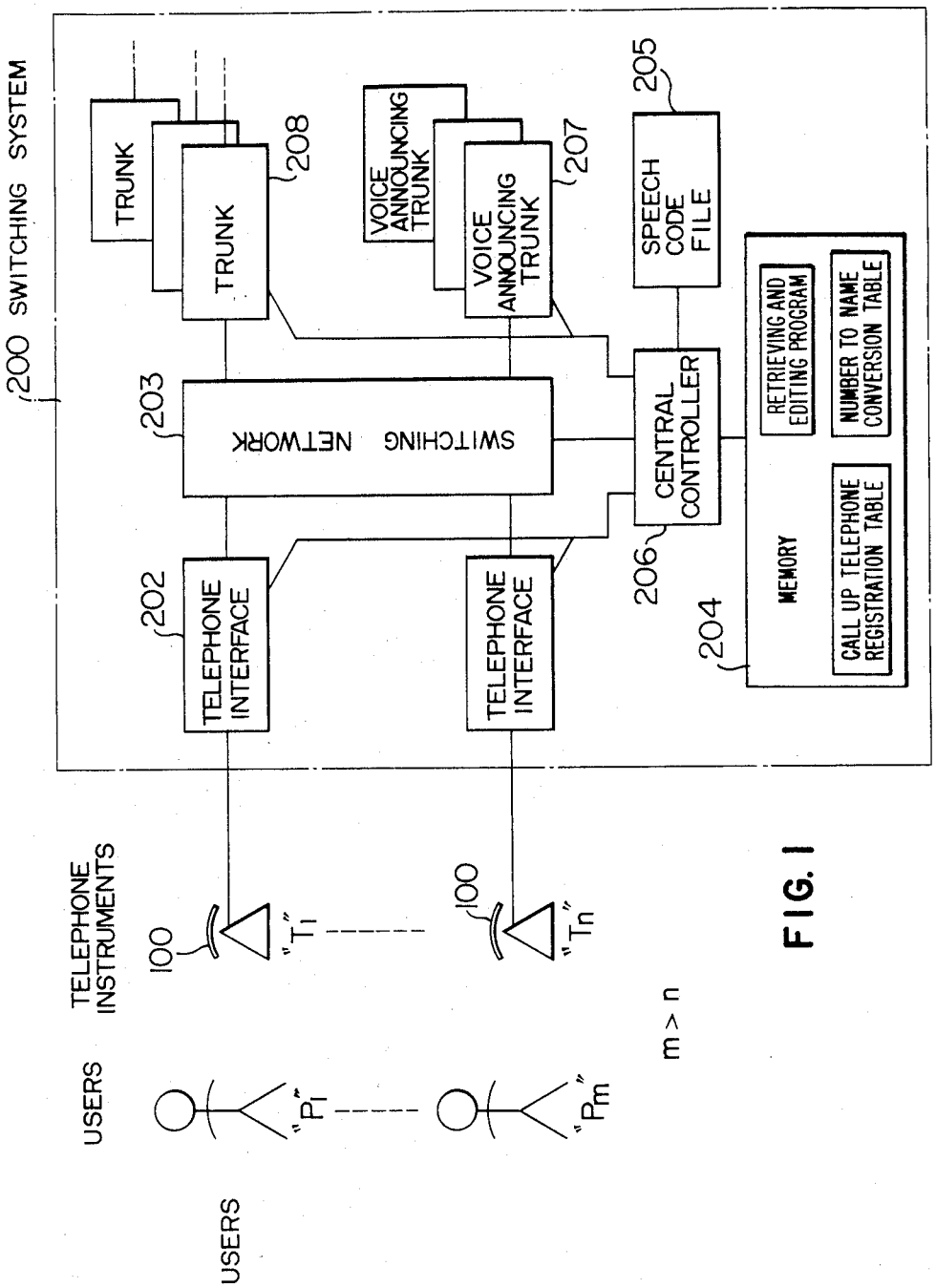
FIG. 1 is a block diagram showing the telephone switching system embodying the present invention.

The system of FIG. 1 is assumed to be a private telephone switching system, with all telephone instruments and users being numbered, where the number of users m is larger than the number of telephone instruments n, i.e., a plurality of persons can be called through one telephone instrument. Directory numbers "$T_1$" through "$T_n$" are the conventionally used telephone numbers assigned to the extension telephone instruments, and dialling one of these numbers results in a station call in which the called telephone instrument merely rings as in the case of the conventional telephone system. Directory numbers "$P_1$" through "$P_m$" are assigned to individual users who are called from certain telephone instruments as registered initially. Since in this example the number of users m is larger than the number of telephone instruments n, more than one person will share one telephone instrument in some cases. When a P-series number is dialled, connection is made to a telephone instrument which the P number is assigned to, and in this case the switching system knows the called person's name from the P number by making reference to a conversion table and performs the following calling service.

Figure 2:
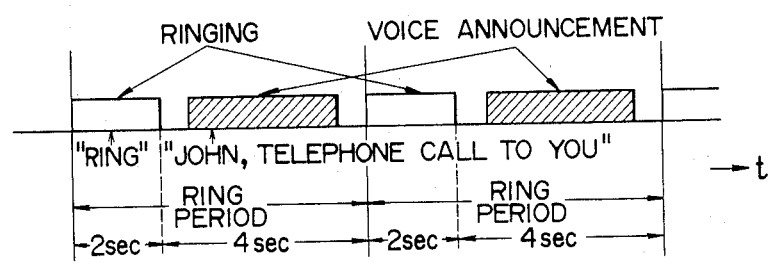
FIG. 2 is a time chart showing the timing relationship between the ring signal and the voice announcement signal.

FIG. 2 is a chart showing the timing relationship between the ring signal and the voice announcement signal —Ring —"John, telephone call to you" —Ring. That is, as can be seen from the figure, paging of the called person's name for example, John, is inserted in the 4-second silent time between contiguous 2-second ring signals. This allows identifying a called person among two or more persons who share one telephone instrument during ringing at a station.

Although in the above example two series of numbers "T" and "P" are used so that a T number is dialled for calling a section of a company not by name or a P number is dialled for calling a specific person, the T number may be eliminated when a call is always made by name.

The following describes the operation of the inventive communication system by way of the illustrated embodiment. In this embodiment, a message for paging a person is produced in the form of analog voice signal in the switching system 200 and transmitted to the telephone instrument 100.

Figure 3:
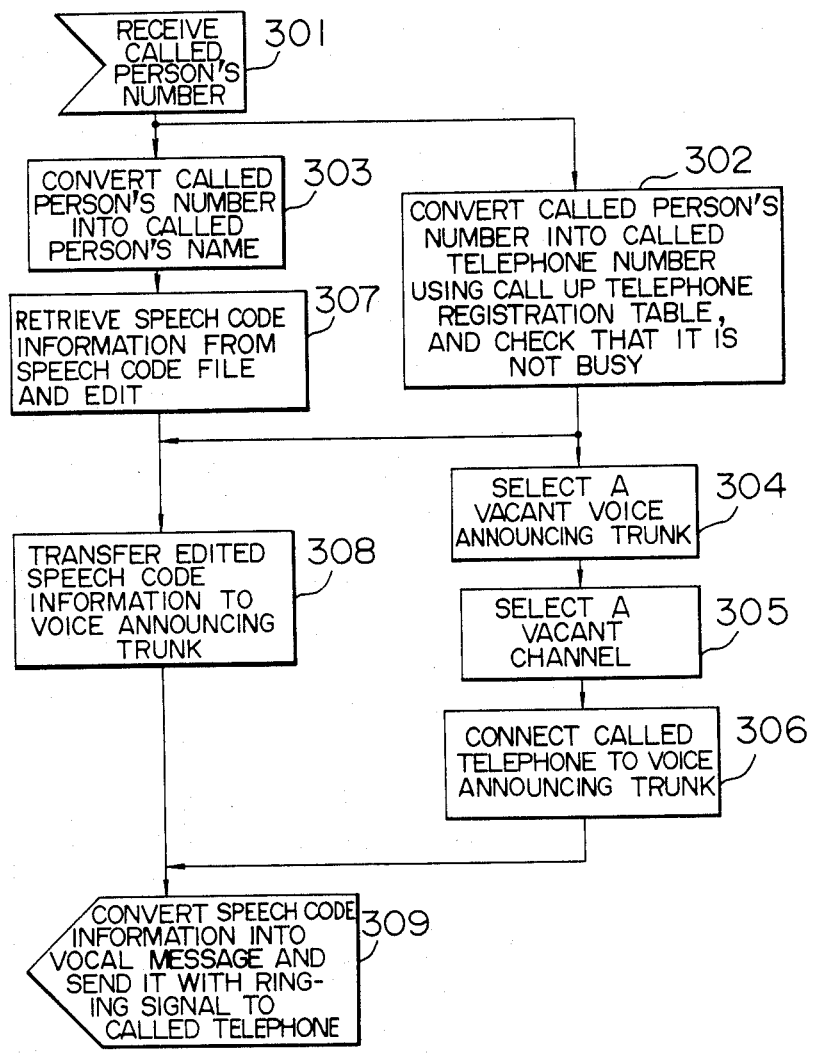
FIG. 3 is a flowchart showing the operation of the switching equipment in paging the called person's name.

FIG. 3 shows by a flowchart the operation of the switching equipment 200 for paging the called person by name at the called telephone instrument. It is assumed that a calling person $P_1$ in FIG. 1 uses a telephone instrument $T_1$ to call a person $P_m$ at a telephone instrument $T_n$. When the calling person $P_1$ lifts the handset of the telephone instrument $T_1$, it is detected by a central controller 206 in the switching equipment 200, which then performs so-called dial tone connection by the program stored in a main memory 204 so that a dial tone is transmitted through a circuit not shown to the telephone instrument $T_1$. On hearing the dial tone, the calling person $P_1$ dials "$P_m$" which number is assigned to the person $P_m$ to be called. The central controller 206 receives the called person's number "$P_m$" (FIG. 3, step 301) and converts it into the called telephone number "$T_n$" using a call up telephone registration table stored in the memory 204 so as to determine the telephone instrument to be connected. At the same time, the central controller 206 checks as to whether the called telephone instrument is busy or free, and, upon confirmation of the free state, proceeds to the next operation (FIG. 3, step 302).

In parallel to the above operation, the central controller 206 converts the called person's number "$P_m$" into the called person's name, "John" in this case, using the conversion table from called person's number to called person's name stored in the memory 204 (FIG. 3, step 303). This process is necessary to synthesize the voice in case a vocal-tract synthesizer is used, but it is not always required in case a waveform coder/synthesizer in which the waveform is sampled and digitized or a source coder/synthesizer in which a vocal-tract transfer function is described as parameters are used. In the latter case, voice information can be directly obtained from the speech code file referring to the called person's number.

Upon confirmation that the called telephone instrument 100 is not busy, the central controller 206 selects an available voice announcing trunk 207 (FIG. 3, step 304), selects a free channel for the called telephone instrument $T_n$ and the voice announcing trunk 207 (FIG. 3, step 305), and connects the trunk to the telephone instrument $T_n$ (FIG. 3, step 306). Needless to say, a ring signal is transmitted to the called telephone instrument through a circuit not shown.

After converting the called person's number "$P_m$" into the called person's name, for example, "John", the central controller 206 extracts speech code information corresponding to the name "John" and other necessary speech code information from the speech code file 205, and edits it into a message, for example, "John, telephone call to you" (FIG. 3, step 307). Here, voice information is sampled to provide digitized voice in pulse code modulation for speech coding or a band-compressed version thereof in the case of waveform coding, or digitally processed voice parameters representing the characteristics of the voice, for example, partial correlation coefficient (PARCOR), in the case of source coding. The edited speech code information is transferred to the voice announcing trunk 207 connected to the called telephone instrument (FIG. 3, step 308), and stored in the memory within the trunk 207. The voice announcing trunk 207 retrieves the stored speech code information at a certain playback speed and at a certain period, and the information is converted into an analog voice signal by a demodulator or a speech synthesizer and then transmitted alternately with the ring signal with the timing relationship shown in FIG. 2 to the telephone instrument $T_n$ through the switching network 203 (FIG. 3, step 309).

The ring signal may be the conventionally used a.c. current activating the electromagnetic bell, or alternatively may be a tone ringer signal producing sounds of mono-tone, melody or chime, but in consideration of the telephone instrument 100 capable of vocal announcement, the use of the tone ringer signal will be the best choice from a technical viewpoint. It is also possible to eliminate the ring signal and uses only the vocal message for calling, but the combination of these two signals is most noticeable by the called party.

Although in the foregoing embodiment the message is transmitted over the voice announcing trunk after it has been converted into an analog signal for the convenience of the analog-type switching system, for the case of a digital-type switching system, waveform coding with the same sampling period and encoding law as those of the switching system 200 is preferably employed, and the voice announcing trunk 207 receives digitized speech code information from the central controller 206 and stores it, and transmits the stored information sequentially at the specified time slot, whereby the same effect as in the previous case of the analog exchange can be achieved. The following estimates the required memory capacity of the voice announcing trunk for a digital switching system with a sampling frequency of 8 kHz for 8-bit words. To make a message of 4 seconds, the necessary memory capacity is 256 K bits (8 kHz×8 bits×4 seconds), and the use of a single 256 K bit memory chip suffices for this purpose.

Figure 4:
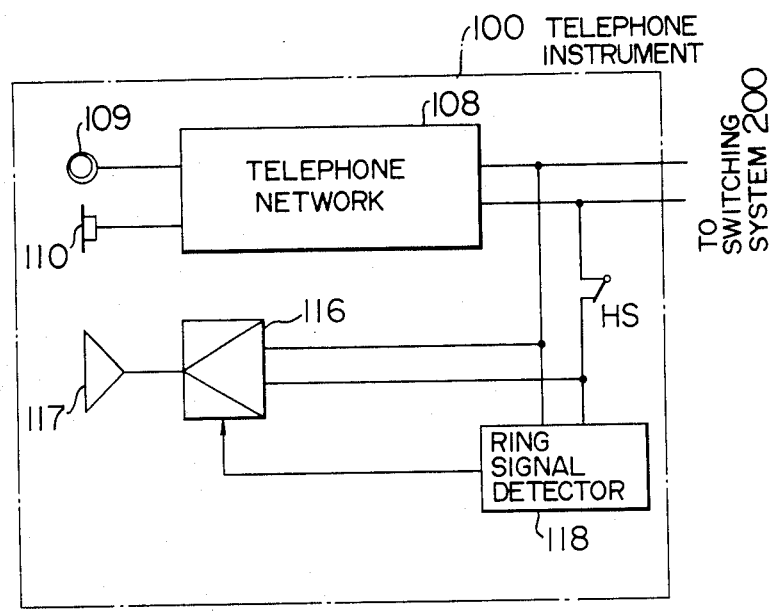
FIG. 4 is a block diagram showing an example of the telephone instrument capable of voice paging.

Next, the operation of the telephone instrument 100 will be described in brief. FIG. 4 shows an example of the telephone instrument 100 which performs voice paging. The telephone instrument 100 incorporates an amplifier 116, a speaker 117 and a ring signal detector 118, and a hook switch HS, which operates when the handset is lifted, is normally closed to establish the circuit as shown in FIG. 4. The amplifier 116 has a small gain or sufficient attenuation in the on-hook state so that noises on the line do not create an acoustic noise through the speaker 117.

The ring signal sent over the line is detected by the ring signal detector 118. In case the ring signal has a form of 16 Hz and 75 VAC, the amplifier 116 is deactivated during the periods of the ring signal shown in FIG. 2. The ring signal activates a bell through a circuit not shown. In FIG. 2, after a ring period has been terminated, the ring signal detector 118 sets up a certain level of gain for the amplifier 116, and the paging voice which is received successively is outputted acoustically through the speaker 117. Upon detection of the next ring signal, the detector 118 deactivates the amplifier 116, and activates it again at the end of the ring signal.

This alternating operation is repeated until the hook switch HS operates by the response of the called party, or until the ring signal is suspended for at least a certain time length due to the abandonment of the call by the calling party. In case the ring signal is provided by a tone ringer, the ring signal detector 118 sets up a certain level of gain for the amplifier 116 immediately upon detection of the ring signal, and both the ring signal and the paged voice are outputted acoustically through the speaker 117.

As described above, the telephone instrument as shown in FIG. 4 operates in unison with the aforementioned exchange to perform vocal announcement for information about the call during the ringing phase of operation.

Figure 5:
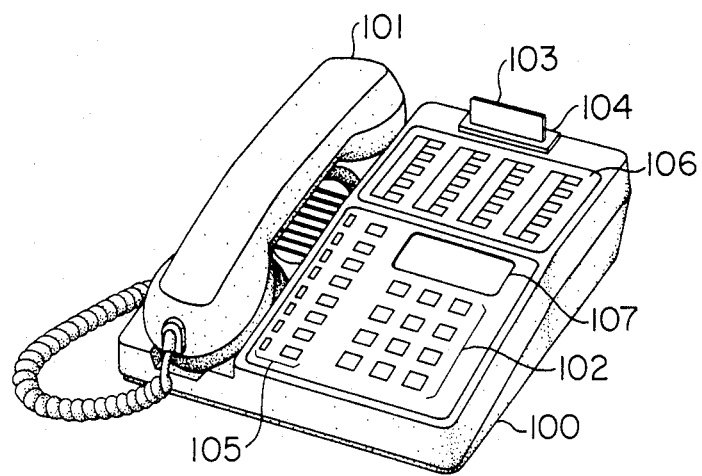
FIG. 5 is a perspective view of an example of the telephone instrument with the capability of reading the identification number of the calling person.
Figure 6:
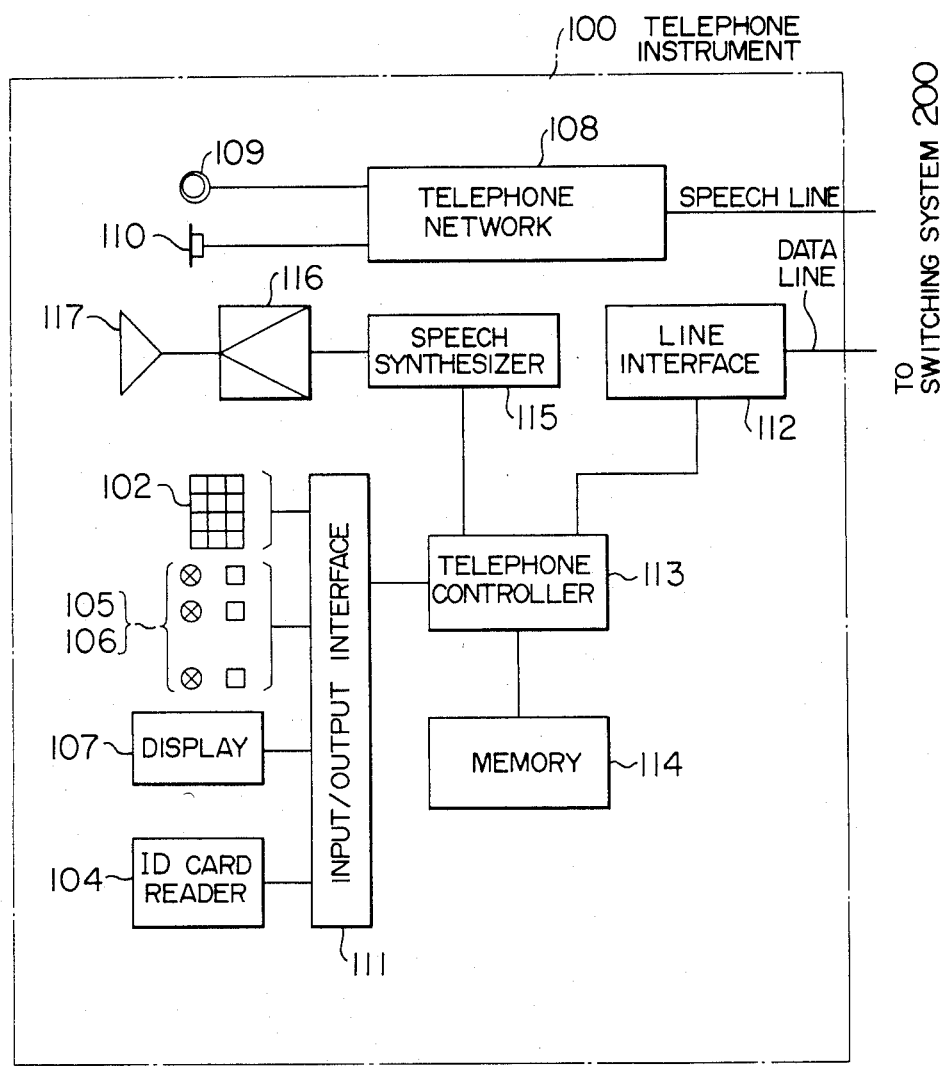
FIG. 6 is a block diagram showing, as an example, the internal arrangement of the telephone instrument shown in FIG. 5.

Next, the second embodiment of the invention, wherein voice information is sent in a digital form to the telephone instrument which stores the information and converts it into vocal sound by the speech synthesizer for paging, will be described. FIGS. 5 and 6 show the external view and internal arrangement of the telephone instrument 100 used in this system. The same assumption is made that a calling person $P_1$ uses a telephone instrument $T_1$ to call a person $P_m$ at a telephone instrument $T_n$ as in the first embodiment.

When the person $P_1$ lifts the handset 101 of the telephone instrument $T_1$, it is detected by the telephone controller 113 in FIG. 6, and a call origination signal is transmitted through the line interface 112 to the switching system 200. The telephone instrument $T_1$ is linked to the switching system 200 through two pairs of cables, one for speech, the other for data transmission. In the switching system 200 shown in FIG. 1, the central controller 206 detects the call origination signal through the telephone interface 202 and performs so-called dial tone connection so that the calling person $P_1$ hears the dial tone. Upon confirmation of the dial tone, the calling person $P_1$ dials the called person's number "$P_m$". The called person's number "$P_m$" is dialed through the pushbutton dial 102, and it is received by the telephone controller 113 through the input/output interface 111. The telephone controller 113 transmits the number "$P_m$" as the digital data through the line interface 112 to the switching system 200.

Figure 7:
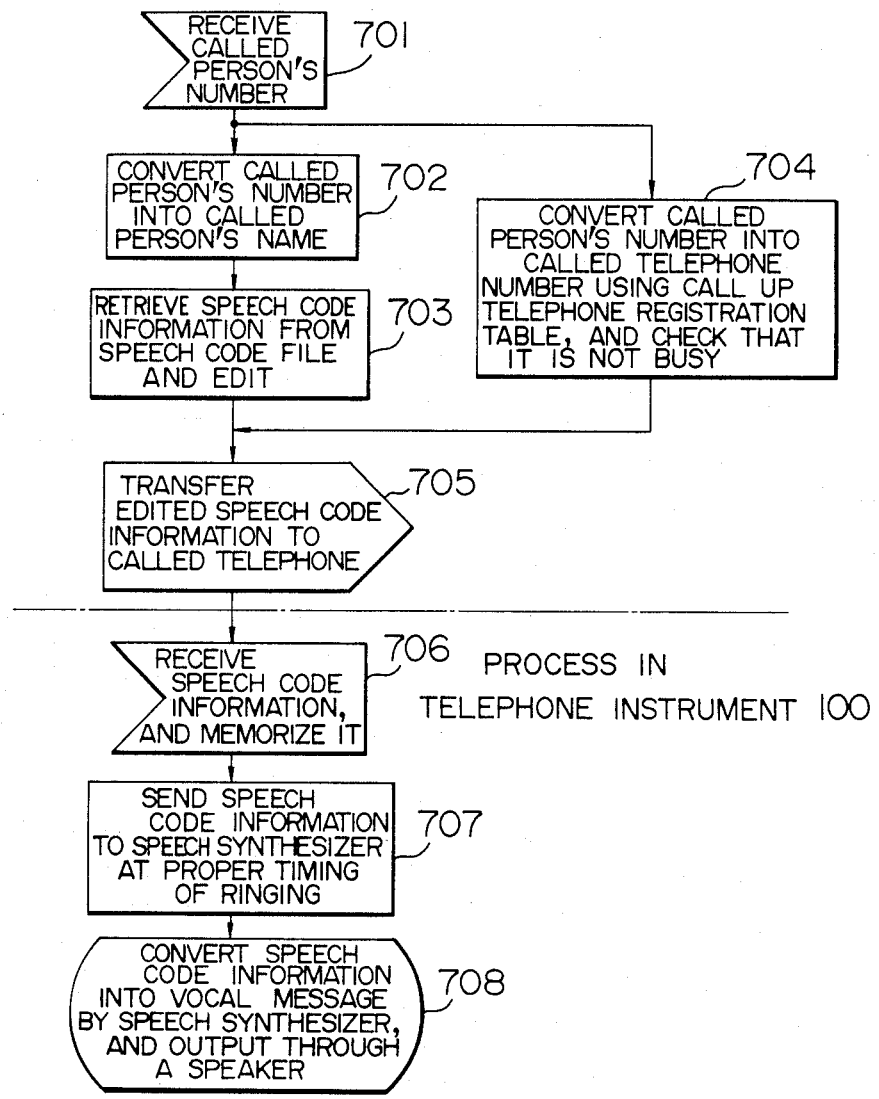
FIG. 7 is a flowchart showing the operation of the switching equipment and telephone instrument to perform the same function as shown in FIG. 3 by means of a different method.

FIG. 7 shows by a flowchart the operation of the switching system 200 and telephone instrument 100 in performing the same function a shown in FIG. 3. In the swtiching system 200, the central controller 206 receives the called person's number "$P_m$" through the telephone interface 202 (FIG. 7, step 701), and converts the number "$P_m$" into the called person's name, e.g. John, using the conversion table stored in the memory 204 (FIG. 7, step 702). Subsequently, the person's name "John" is converted into corresponding voice information, e.g., parameters which have been coded from voice based on the source coding, using the speech code file 205, and at the same time coded speech parameters, for example "telephone call to you" are retrieved from the speech code file 205 and combined with the person's name parameters (FIG. 7, step 703). In parallel to the above operation, the central controller 206 determines the called telephone instrument to be $T_n$ from the called person's number "$P_m$" using the call up telephone registration table stored in the memory 204, and checks as to whether the called telephone $T_n$ is busy, then proceeds to the next operation when it is found not busy (FIG. 7, step 704). The central controller 206 transmits the edited coded speech parameters for paging the called person's name in the digital form to the telephone instrument 100 through the telephone interface 202 using a data transmission pair. In the telephone instrument 100 of FIG. 6, the telephone controller 113 receives the speech parameters through the line interface 112, and it is stored in the memory 114. The telephone controller 113 first operates on the speech synthesizer 115 to output the ring signal in accordance with the format shown in FIG. 2. The speech synthesizer 115 produces a ring signal of a certain duration and transfers it to the amplifier 116, which amplifiers the signal to a certain output level and feeds it to the speaker 117. At the time of message announcement following a ring as shown in FIG. 2, the telephone controller 113 retrieves the speech parameters from the memory 114 and transfers them to the speech synthesizer 115. The speech synthesizer 115 synthesizes a vocal message from speech parameters, and the message is amplified by the amplifier 116 and fed to the speaker 117. Persons nearby the called telephone instrument $T_n$ notice the incoming call by hearing the first ring signal, and then are informed that the call is to John by hearing the subsequent paging "John, telephone call to you."

Although in the foregoing embodiments the called person's name is paged, the invention is also apppplicable to the case of announcing the calling person's name. In this case, users of the telephone system bear an identification card with a record of individual identification number or name, and make a call through a telephone instrument associated with a card reader as shown in FIG. 5. Namely, the calling person puts his or her identification card 103 into the card reader 104, then lifts the handset 101.

Figure 8:
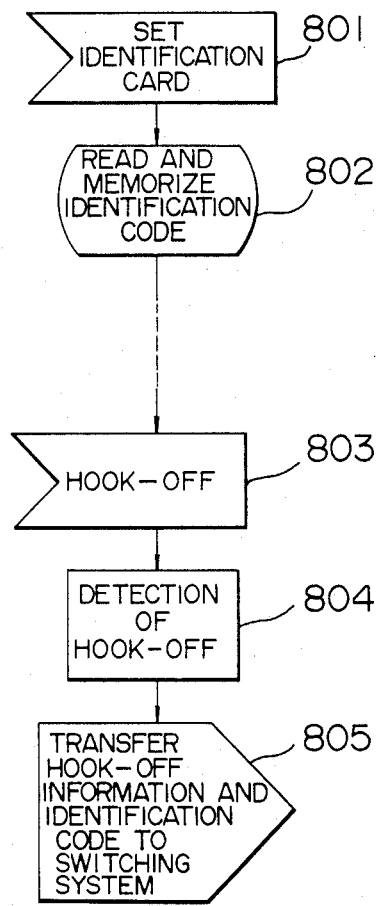
FIG. 8 is a flowchart showing the operation of the telephone instrument in entering the identification number of the calling person.

FIG. 8 shows by a flowchart the operation of the telephone instrument in reading the caller's identification card. When the identification card 103 is placed in the card reader 104 (FIG. 8, step 801), the telephone controller 113 in FIG. 6 operates on the card reader 104 to read the record through the input/output interface 111 and it is transferred to the memory 114 (FIG. 8, step 802). Subsequently, when the handset 101 is lifted (FIG. 8, step 803), it is detected by the telephone controller 113 (a circuit not shown) (FIG. 8, step 804), and the telephone controller 113 retrieves the calling person's identification number from the memory 114 and send it together with the off-hook information through the line interface 112 to the switching system 200 (FIG. 8, step 805). In the switching system 200, the central controller 206 receives the information through the telephone interface 202, and stores it in the memory 204 and at the same time performs dial tone connection in response to the off-hook information. The called person's number is dialled, and in parallel to the conversion process in step 303 of FIG. 3 or step 702 of FIG. 7 the identification number is converted into the calling person's name. When the call does not require paging of the called person's name, the conversion from the identification number to the calling person's name takes the place of the conversion shown in step 303 of FIG. 3 or step 702 of FIG. 7. Then a message for announcing the calling person's name is edited in the same process as described in connection with FIGS. 3 and 7. The identification number may be equal to the personal directory numbers "$P_1$" through "$P_m$", or may be assigned separately. In the latter case, two conversion tables for the conversions of step 303 in FIG. 3 or step 702 in FIG. 7 and for the conversion from the identification number to person's name may be used.

Although the above embodiment is for announcing the calling person's name and called person's name during the ringing phase of operation, it is also possible to announce other information related to the call such as the class of urgency, and moreover it is possible to allow an urgent communication to be made through the speaker during the normal speech, or to indicate the state of call-waiting.

Although in the foregoing embodiments an announcement is made for the called party, it is also possible to inform the calling party of the state of a call such as with the vocal message "called party busy", "trunk busy", "called person absent", "do not disturb", and so on. These messages may be given to the calling person through the handset of the telephone instrument, instead of using a separate speaker.

As described in detail in the embodiments, the present invention enables automatic vocal announcement about the state of a call through the introduction of the speech synthesizing technique to the switching system, whereby the office efficiency in using the communication system can be improved significantly.

Particularly, the present invention enables a direct response by the called person through the paging of the called person's name on the called telephone instrument, thereby improving the efficiency of office work when compared with the conventional communication style where someone responds to a ringing telephone to determine who the actual called person is and then passes the call to the called person, whereby the value of the communication system in the field of office automation is significantly enhanced.

Moreover, the present invention allows the calling party who encounters the absence of the called party to receive a message such as "John is absent, so call him again later".

What is claimed is:

1. A communication system with voice announcement means, comprising:
    (i) a plurality of terminal devices;
    (ii) a switching system connected to said terminal devices, wherein a person identification number is assigned to each user independently of said terminal device and said personal identification number is registered in the switching system as a directory number to get access to a desired person, and having
    means for storing elemental coded speech signals from which a vocal announcement of a person's name may be generated, means responsive to signals representing a personal identification number received from a calling terminal device and exclusively representing a called person for identifying the called person's name and a terminal device assigned to the called person,
    means responsive to said identifying means for retrieving and editing said elemental coded speech signals from said storing means to form a coded vocal message indicating the called person's name,
    means for synthesizing said edited coded message into a vocal message including the name of the called person, and
    means for transmitting said speech synthesized vocal message to the called terminal device identified by said identifying means; and
    (iii) said terminal devices having means for receiving a speech synthesized vocal message transmitted from said switching system, and means for vocally announcing said speech synthesized vocal message during a signalling period of a call.

2. A communication system according to claim 1, wherein:
    each user has an identification card with a record of the user's personal identification number thereon;
    each terminal device further having means for reading a personal identification number of a caller from an identification card inserted therein, and means for transmitting said personal identification number to said switching system; and
    said identifying means further including means responsive to receipt of a personal identification number of a caller sent from a terminal device for identifying the name of te caller, and means for retrieving and editing elemental coded speech signals from said storing means to form a coded vocal message indicating the calling person's name on the basis of identification of said caller's personal identification number by said identifying means.

3. A communication system with voice announcement means, comprising:
    (i) a plurality of terminal devices;
    (ii) a switching system connected to said terminal devices, wherein a personal identification number is assigned to each user independently of said terminal device and said personal identification number is registered in the switching system as a directory number to get access to a desired person, and having
    means for storing elemental coded speech signals from which a vocal announcement of a person's name may be generated,
    means responsive to signals representing a personal identification number received from a calling terminal device and exclusively representing a called person for identifying the called person's name and a terminal device assigned to the called person,
    means responsive to said identifying means for retrieving and editing said elemental coded speech signals from said storing means to form a coded message indicating the called person's name, and
    means for transmitting said edited coded message to the called terminal device identified by said identifying means; and
    (iii) said terminal devices having means for receiving an edited coded message transmitted from said switching system, means for synthesizing the received coded message into a vocal message including the name of the called person, and means for vocally announcing said speech synthesized vocal message during a signaling period of a call.

4. A communication system according to claim 3, wherein:
    each user has an identification card with a record of the user's personal identification number thereon;
    each terminal device further having means for reading a personal identification number of a caller from an identification card inserted therein, and means for transmitting said personal identification number to said switching system; and
    said switching system further including means responsive to receipt of a personal identification number of a caller sent from a terminal device for identifying the name of the caller, and means for retrieving and editing elemental coded speech signals from said storing means to form a coded vocal message indicating the called person's name on the basis of identification of said caller's personal identification number by said identifying means.

5. A communication system having a voice announcement means and wherein each user has an idenficiation card with a record of the user's personal identification number thereon, comprising:
(i) a plurality of terminal devices;
(ii) a switching system connected to said terminal device, and having
means for storing elemental coded speech signals from which a vocal announcement of a person's name may be generated,
means responsive to the personal identification number of a caller sent from a calling terminal device for identifying the name of the caller,
means responsive to said identifying means for retrieving and editing elemental coded speech signals from said storing means to form a coded vocal message indicating the calling person's name,
means for synthesizing said edited coded message into a vocal message including the name of the calling person, and
means for transmitting said speech synthesized vocal message to the called terminal device; and
(iii) said terminal devices having
means for reading a personal identification number of a caller from an identification card inserted therein,
means for transmitting said personal identification number to said switching system,
means for receiving a speech synthesized vocal message transmitted from said switching system, and
means for vocally announcing said vocal message during a signaling period of a call.

6. A communication system with voice announcement means, comprising:
(i) a plurality of terminal devices;
(ii) a switching system connected to said terminal devices and having
means for storing elemental coded speech signals from which a vocal announcement of a reason for failure to complete a call to a called terminal device that a called line is busy, all trunks are busy, a called person is absent, or a called person does not want to be disturbed may be generated,
means responsive to the reason for failure for retrieving and editing elemental coded speech signals from said storing means to form a coded vocal message stating to a caller the reason for failure to complete the call,
means for synthesizing said edited code message into a vocal message, and
means for transmitting said speech synthesized vocal message to the calling terminal device through a speech path.

7. A communication system with voice announcement means, comprising:
(i) a plurality of terminal devices;
(ii) a switching system connected to said terminal devices,
wherein each user has an identification card with a record of the user's personal identification number thereon; and having
means for storing elemental coded speech signals from which a vocal announcement of a person's name may be generated,
means responsive to the personal identification number of a caller sent from a calling terminal device for identifying the name of the caller,
means responsive to said identifying means for retrieving and editing elemental coded speech signals from said storing means to form a coded vocal message indicating the calling person's name, and
means for transmitting said edited coded message to the called terminal device; and
(iii) said terminal devices having
means for reading a personal identification number of a caller from an identification card inserted therein,
means for transmitting said personal identification number to said switching system,
means for receiving an edited coded message transmitted from said switching system,
means for synthesizing said edited coded message into a vocal message including the name of the calling person, and
means for vocally announcing said speech synthesized vocal message during a signaling period of a call.

8. A communication system with voice announcement means, comprising:
(i) a plurality of terminal devices;
(ii) a switching system connected to said terminal devices and having
means for storing elemental codes speech signals from which a vocal announcement of a reason for failure to complete a call to a called terminal device that a called line is busy, all trunks are busy, a called person is absent, or a called person does not want to be disturbed may be generated,
means responsive to reason for failure for retrieving and editing elemental coded speech signals from said sotring means to form a coded vocal message stating to a caller the reason for failure to complete the call, and
means for transmitting said edited coded message to the calling terminal device; and
(iii) said terminal devices having
means for receiving said edited coded message transmitted from said switching system,
means for synthesizing said edited coded message into a vocal message, and
means for vocally announcing said speech synthesized vocal message to the caller.

9. A communication system with voice announcement means, comprising:
(i) a plurality of terminal devices;
(ii) a switching system connected to said terminal devices and having
means for storing elemental coded speech signals from which a vocal announcement of status of a call on a line to a communicating terminal device that an urgent call is waiting for connection or a call is waiting for the line to become idle may be generated,
means responsive to the status of a call on a line for retrieving and editing elemental coded speech signals from said storing means to from a coded vocal message to a communicating party indicating the situation of the line, and
means for transmitting said edited coded message to said communicating terminal device; and
(iii) said terminal devices having
means for receiving an edited coded message transmitted from the switching system,
means for synthesizing the received coded message into a vocal message to the communicating party, and
means for vocally announcing said speech synthesized vocal message through a separate acoustic transducer from a communicating receiver.

* * * * *